June 9, 1964

M. J. MATOVICH, JR 3,136,168

TAPE DRUM GENEVA DRIVE APPARATUS WITH INTERMITTENTLY ENGAGED CLUTCH

Filed June 19, 1962

3 Sheets-Sheet 1

INVENTOR.
MITCHEL J. MATOVICH, JR.

BY

R. Hodges ATTY
Frank P. Presta AGENT.

INVENTOR.
MITCHEL J. MATOVICH, JR.

BY
O. E. Hodges ATTYS
Frank P. Presta AGENT.

June 9, 1964 | M. J. MATOVICH, JR | 3,136,168

TAPE DRUM GENEVA DRIVE APPARATUS WITH INTERMITTENTLY ENGAGED CLUTCH

Filed June 19, 1962 | 3 Sheets-Sheet 3

INVENTOR.
MITCHEL J. MATOVICH, JR.

BY
D. E. Hodges ATTYS.
Frank P. Presta AGENT.

United States Patent Office 3,136,168
Patented June 9, 1964

3,136,168

TAPE DRUM GENEVA DRIVE APPARATUS WITH INTERMITTENTLY ENGAGED CLUTCH

Mitchell J. Matovich, Jr., Sunnyvale, Calif., assignor, by mesne assignments, to the United States of America as represented by the Secretary of the Navy Filed June 19, 1962, Ser. No. 203,668
13 Claims. (Cl. 74—125.5)

This invention relates to a punched tape drum drive mechanism and more particularly to a drum drive mechanism which moves a punched tape past a sensing device in such a manner that the blocks of information on the tape will come to rest under the sensing device for a given length of time before the tape is again indexed.

Previously used punched tape driving mechanisms have numerous disadvantages; for example, the stepping action is not always positive resulting in poor readout reliability; the stepping mechanism accelerates too rapidly, occasionally resulting in tape breakage; adjustment of the escapement mechanism is extremely difficult; and there is a very high noise and vibration level. The general purpose of this invention is to provide a drive mechanism for a punched tape which embraces all of the advantages of the prior art devices and possesses none of the aforedescribed disadvantages.

It is therefore an object of this invention to provide a new and improved mechanism of the character described.

It is another object to provide a new and improved drive mechanism to intermittently move a punched tape past a sensing device.

It is a further object to provide an intermittent drive mechanism of the character described which is silent, smooth, accurate and reliable in operation.

It is a still further object to provide such a drive mechanism which utilizes a clutch and escapement.

Other objects and various further features of novelty and invention will be apparent to those skilled in the art from a reading of the following specification in conjunction with the accompanying drawings, which show for illustrative purposes only, a preferred form of the invention and in which.

Figure 1:
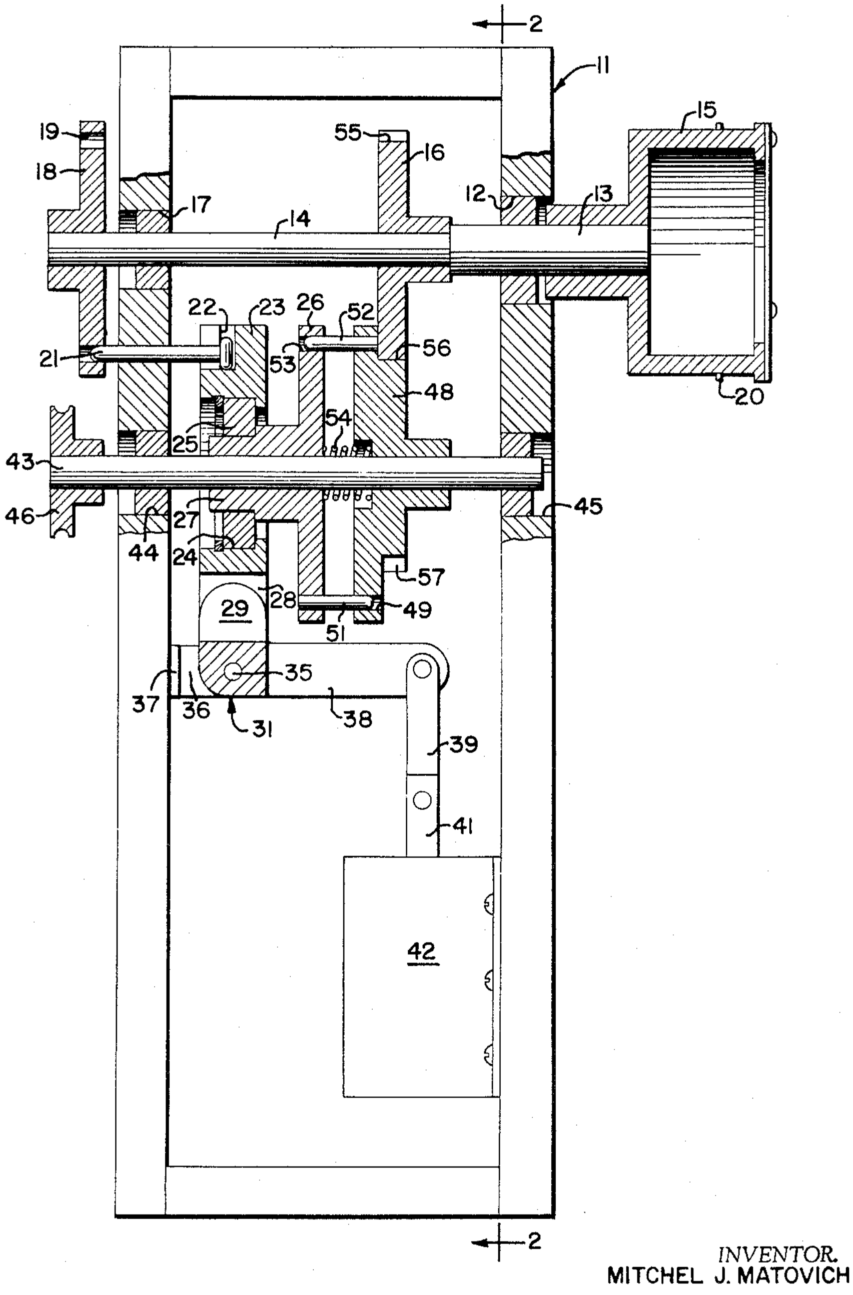
FIG. 1 is a front elevation view, partly in section, of a preferred embodiment of the invention.

Referring now to FIG. 1, the reference numeral 11 designates a housing having a bore 12 in which an enlarged portion 13 of the drum shaft 14 is rotatably mounted. A drum 15 is rigidly mounted on the enlarged portion 13 and has a plurality of pins 20 adapted to engage the feed holes in a punched tape. A Geneva cam 16 is rigidly mounted on the drum shaft 14 adjacent the enlarged portion 13. The drum shaft 14 is rotatably mounted in a bore 17 in the housing 11 and has a portion extending beyond the housing upon which a lock ring 18 is rigidly mounted. The lock ring 18 is provided with a number of holes 19 which are adapted to receive one end of a locking pin 21 which is slideably mounted in the housing 11 and has the other end thereof retained in a groove 22 of an idler member 23.

Figure 3:
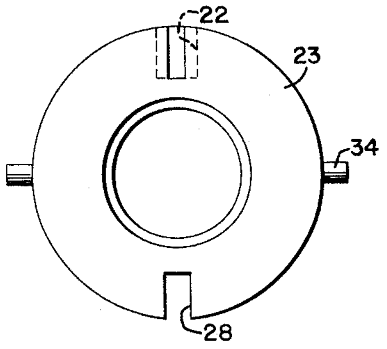
FIG. 3 is a front view of the idler shown in section in FIG. 1.
Figure 4:
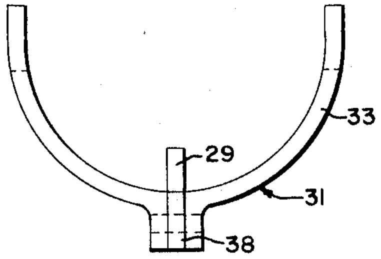
FIG. 4 is a front view of the clutch actuating yoke and tab disclosed in FIGS. 1 and 2.
Figure 5:
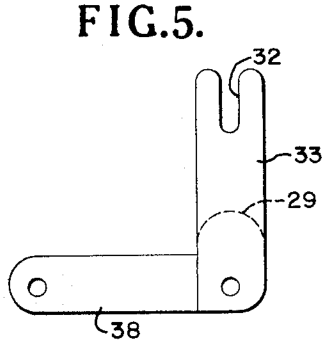
FIG. 5 is a side view of the apparatus shown in FIG. 4.

The idler member 23 is provided with a groove 24 in the interior surface thereof which is adapted to receive a bearing ring 25 that rotatably encloses a narrow portion 27 of a clutch ring 26. As shown in FIGS. 3 to 5, a guide slot 28 is formed in the idler member 23 to receive a tab 29 that is rigidly mounted on the clutch actuating yoke 31 to prevent rotation of the idler member 23. Longitudinal slots 32 are provided in the yoke arms 33 to receive pins 34 which are rigidly mounted in the idler member 23. The yoke 31 is pivotally mounted on a pin 35 that is rigidly mounted between two brackets 36 supported by a plate 37 which is rigidly attached to the housing 11. An extension 38 is provided on the yoke 31 and is pivotally connected to a rod 39 that is in turn pivotally connected to the moveable rod member 41 of a solenoid 42 which is rigidly mounted within the housing 11.

A drive shaft 43 is rotatably mounted within bores 44 and 45 in the housing 11, and is provided with a pulley 46 that may be driven by any suitable means such as a motor. The clutch ring 26 is slidably mounted on the drive shaft 43 so as to slide longitudinally thereon, and a drive cam 48 is rigidly mounted on the drive shaft 43 adjacent the clutch ring 26 and is provided with a hole 49 for slidably receiving an actuating pin 51 that is rigidly mounted on the clutch ring 26. A steadying pin 52 is rigidly mounted on the driver cam 48 and is received within a hole 53 in the clutch ring 26 to insure that the drive shaft, driver cam and clutch ring will rotate in unison. A spring 54 is provided between the clutch ring and the driver cam to normally bias the clutch ring away from the driver cam, thereby normally retaining the end of the locking pin 21 within one of the holes 19 in the lock ring 18 to prevent rotation of the drum shaft 14.

Figure 2:
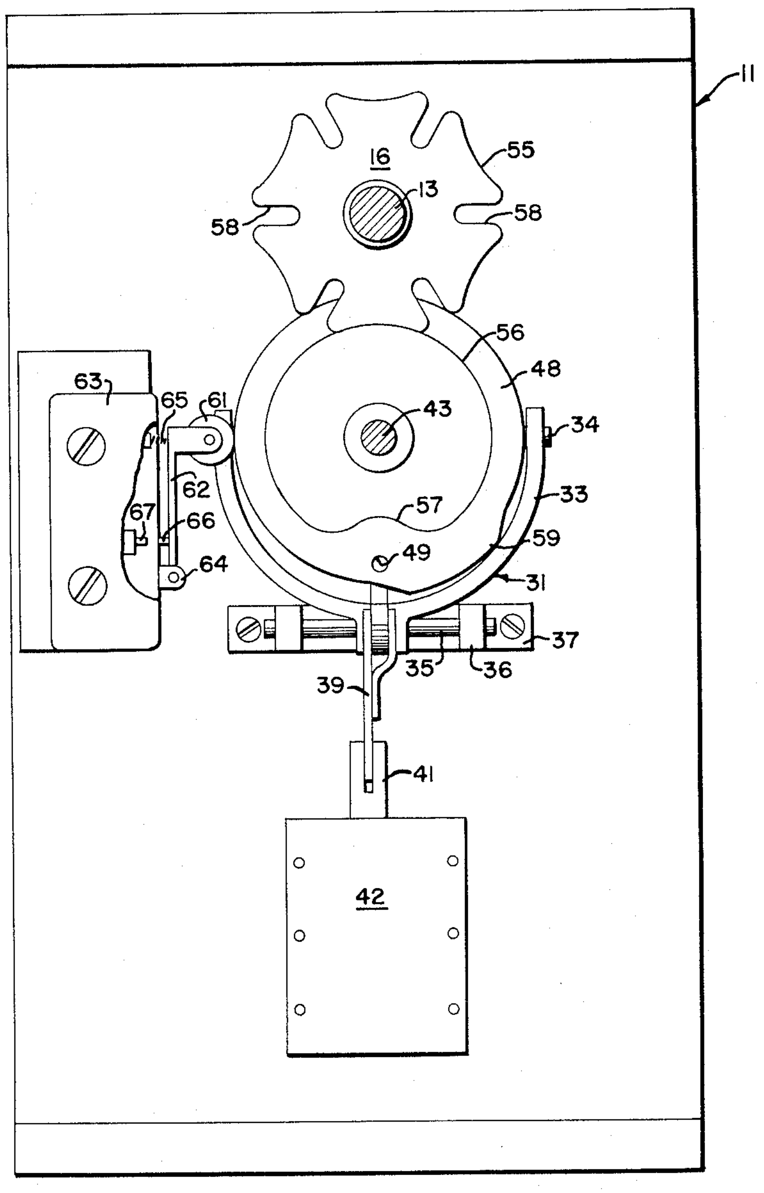
FIG. 2 illustrates a sectional elevation of the apparatus taken along the line 2—2 of FIG. 1.
Figure 6:
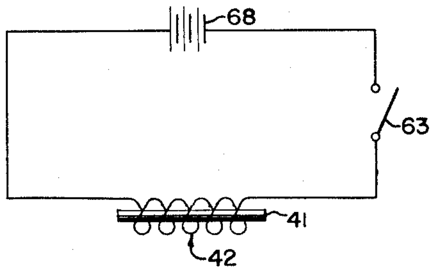
FIG. 6 is a diagram of the circuit between the switch shown in FIG. 2 and the solenoid shown in FIGS. 1 and 2.

As shown in FIG. 2, the Geneva cam 16 has a number of cam surfaces 55 which are adapted to engage the cam surface 56 on the driver cam 48. The cam surface 56 has a recessed portion 57 adjacent the driver cam hole 49, thereby allowing movement of the Geneva cam 16 when the recessed portion 57 is adjacent the Geneva cam. Radial slots 58 are formed in the Geneva cam 16 and are adapted to receive the end of the lock pin 51 on the clutch ring 26 when the lock pin is extended completely through the hole 49 in the driver cam 48. A cam surface 59 is formed on the portion of the driver cam in which the hole 49 for the lock pin 48 is formed, and this surface is adapted to engage a roller 61 that rides on the driver cam 48. The roller 61 is rotatably mounted on a contact arm 62 which forms part of a switch 63 and is pivotally mounted on a bracket 64. A spring 65 normally biases the roller 61 and contact arm 62 toward the driver cam 48, thereby separating the contact 66 mounted on the arm 62 and the stationary contact 67. As shown in FIG. 6, the switch 63 is connected in the circuit between the solenoid 42 and the battery 68, with the result that the solenoid 42 cannot be actuated unless the switch 63 is closed. It is noted that, instead of the battery 68, another power source could be used which is capable of being disconnected from the circuit at the discretion of an operator or by control means responsive to information received from the punched tape, so that the tape may be subjected to a continuous or intermittent stepping action. The switch 63 will be closed only when the cam surface 59 engages the roller 61 so as to bring together the moveable contact 66 and the stationary contact 67. It is noted that the cam surface 59 is of sufficient size and is located so as to insure accurate periodic movement of the Geneva cam 16.

In operation, the drive shaft 43 is continually rotating and all of the components are in the normal position shown in FIGS. 1 and 2. In this position, the driver cam 48 and the clutch ring 26 are continually rotating, with the clutch ring free to slide longitudinally on the drive shaft 43. The idler member 23 is restrained from any rotational movement by the tab 29 which is received within the idler guide slot 28. The drum 15 is locked accurately in position by the locking pin 21 which is mounted in the idler member 23 and is received within one of the holes 19 in the lock ring 18 that is rigidly attached to the drum shaft 14.

During the rotation of the driver cam 48, each time the cam surface 59 engages the roller 61 to close the switch 63 the solenoid 42 will be actuated, with the result that the moveable solenoid member 41 will be pulled downwardly. This will cause the actuating yoke 31 to be pivoted on the pin 35 to shift the idler member 23 and the clutch ring 26 against the tension of the clutch spring 54 and toward the driver cam 48. As this motion occurs, the locking pin 21 is withdrawn from the hole 19 in the lock ring 18 and the actuating pin 51 mounted on the clutch ring 26 is extended through the hole 49 in the driver cam 48. The actuating pin 51 is received within one of the slots 58 in the Geneva cam 16, and at this time the recessed portion 57 of the cam surface 56 is adjacent the Geneva cam 16 to allow movement thereof. Therefore, since the actuating pin 51 engages one of the slots 58 in the Geneva cam only through a small percentage of each revolution of the driver cam 48, a definite periodic motion of the drum 15 is provided. The cam actuated switch 63 insures that the solenoid 42 can only be energized when the actuating pin 51 and the recessed cam portion 57 are in a proper position in relation to the Geneva cam 16.

Various modifications may be made without departing from the scope of this invention; for example, the clutch actuating yoke and idler member may be actuated mechanically or by fluid control means; and the drum shaft may be locked against rotation by any suitable means other than a lock ring and locking pin.

While the invention has been described in detail with reference to the preferred form shown, it will be understood that various other modifications may be made within the scope of the invention as defined in the appended claims.

What is claimed is:

1. Apparatus for driving a tape drum comprising a housing, a drum shaft rotatably mounted on said housing and rigidly attached to the drum, means on said drum shaft for the rotation thereof, means on said drum shaft for periodically preventing the rotation thereof, a drive shaft rotatably mounted on said housing, means for rotating said drive shaft, a clutch ring slideably mounted on said drive shaft and adapted to rotate therewith, an idler member rotatably mounted on said clutch ring and adapted to slide therewith, means for connecting said idler member to said drum shaft rotation preventing means, means connected to said idler member for periodically sliding said idler and said clutch ring on said drive shaft, cam means rigidly mounted on said drive shaft adjacent said clutch ring and having a cam surface adjacent to said drum shaft rotating means adapted to prevent the free movement thereof, spring means mounted between said clutch ring and said cam means to normally separate said ring and said cam means, and means including said drum shaft rotating means to connect said clutch ring and drive shaft to said drum shaft for intermittent rotation of said drum.

2. The apparatus of claim 1 wherein said means on said drum shaft for the rotation thereof comprises a Geneva cam rigidly mounted on said drum shaft and having radial slots therein.

3. The apparatus of claim 2 wherein said means to connect said clutch ring and drive shaft to said drum shaft comprises an actuating pin mounted on said clutch ring and adapted to engage one of said slots in said Geneva cam when said means connected to said idler member slides said idler and clutch ring on said drive shaft toward said cam means.

4. The apparatus of claim 1 wherein said means on said drum shaft for periodically preventing the rotation thereof comprises a lock ring rigidly mounted on said drum shaft and having holes therein.

5. The apparatus of claim 4 wherein said means for connecting said idler member to said drum shaft rotation preventing means comprises a locking pin having one end mounted on said idler member and having the other end periodically received within one of said holes in said lock ring to prevent the rotation thereof.

6. The apparatus of claim 1 wherein said clutch ring is slideably mounted on said drive shaft by a splined connection.

7. The apparatus of claim 1 wherein said means to prevent rotation of said idler member comprises a guide slot in said idler and a tab which is slideably received in said slot and mounted on said means for sliding said idler and said clutch ring on said drive shaft.

8. The apparatus of claim 1 wherein said means for sliding said idler and said clutch ring on said drive shaft comprises a yoke member having slots therein and pins mounted on said idler member slideably received within said slots.

9. The apparatus of claim 8 wherein said yoke member has a first portion thereof pivotally mounted on said housing and a second portion thereof extending from said first portion, a solenoid mounted on said housing and having the moveable member thereof pivotally connected to said second portion of said yoke.

10. The apparatus of claim 1 wherein said cam surface has a recessed portion therein to allow a limited movement of said drum shaft rotating means when said recessed portion is adjacent thereto.

11. Apparatus for intermittently moving a punched tape past a sensing device comprising a housing, a drum shaft pivotally mounted within said housing, a drum for the punched tape rigidly attached to said drum shaft, a Geneva cam having slots therein and rigidly attached to said drum shaft, a lock ring having holes therein rigidly mounted on said drum shaft, a drive shaft rotatably mounted within said housing and having a pulley at one end for the rotation thereof, a clutch ring slideably mounted on said drive shaft and adapted to rotate therewith, an idler member having a groove therein rotatably mounted on said clutch ring and adapted to slide therewith, a locking pin having one end mounted in said idler groove and having the other end thereof adapted to be periodically received in one of said holes of said lock ring, a driver cam rigidly mounted on said drive shaft adjacent said clutch ring and having a hole therein, an actuating pin rigidly mounted in said clutch ring and adapted to be slideably received within said hole in said driver cam, spring means mounted between said clutch ring and said driver cam to normally separate said ring and said cam, and means to periodically slide said idler member and said clutch ring toward said driver cam against the force of said spring means to engage said actuating pin in one of said slots of said Geneva cam and to remove said locking pin from one of said holes in said lock ring, thereby to allow rotation of said tape drum.

12. The apparatus of claim 11 wherein said means for sliding said idler member and said clutch ring on said drive shaft comprises a yoke member having a portion thereof pivotally mounted on said housing and a second portion thereof extending from said first portion, a solenoid rigidly mounted on said housing and having a moveable member pivotally connected to said second portion of said yoke member, and switch means in the solenoid actuating circuit adapted to prevent actuation of said solenoid and sliding movement of said idler and said clutch ring when said actuating pin is not aligned with one of said slots in said Geneva cam.

13. The apparatus of claim 12 wherein said driver cam has an enlarged cam portion and said switch means has a roller mounted on a contact arm which is adapted to be periodically engaged by said cam portion to close said switch means and allow actuation of said solenoid.

References Cited in the file of this patent

UNITED STATES PATENTS 2,537,280 Rabinowitz -------------- Jan. 9, 1951